Patented Sept. 7, 1937

2,091,983

UNITED STATES PATENT OFFICE 2,091,983

DEHUMIDIFYING SOLUTION

Sheldon B. Heath and Forest R. Minger, Midland, Mich., assignors to The Dow Chemical Company, Midland, Mich., a corporation of Michigan No Drawing. Application July 11, 1935, Serial No. 30,881

2 Claims. (Cl. 252—2.5)

The invention relates to solutions suitable for dehumidifying air and other like gases and particularly to a solution for use in air conditioning apparatus in which the solution is to be reconcentrated after dilution caused by absorption of moisture during use.

It has been proposed to use hygroscopic salt solutions such as those of lithium chloride, calcium chloride, lithium bromide, and the like, in dehumidifying air. Such solutions of the single salts, however, are not entirely satisfactory because many industrial applications of air conditioning require a lower dew point in the treated air than can be obtained with even a saturated solution of lithium bromide, which solution possesses the lowest vapor pressure at a corresponding temperature of any hygropscopic salt solutions, such as those aforementioned.

The principal object of the invention is to provide a dehumidifying solution prepared from ordinary hygroscopic salts which solution is odorless, can be reconcentrated repeatedly substantially without decomposition, and which makes possible the drying of air and like gases to a lower humidity range than that covered by a lithium bromide solution. Other objects and advantages will appear as the description proceeds.

We have found that aqueous solutions containing both lithium bromide and lithium chloride together can be prepared having a much higher solute concentration than a saturated aqueous solution of either salt alone at like temperature. As a result solutions of the mixed salts can be prepared having a considerably lower vapor pressure than can be obtained with solutions of either salt alone at corresponding temperatures. We have found also that the incorporation in the solution containing lithium chloride and lithium bromide of other hygroscopic salts in varying amount up to the limit of their solubility therein still further reduces the vapor pressure of the solution. Among the salts which are suitable for such use are calcium bromide and calcium chloride as disclosed in our co-pending application Serial No. 743,348, filed September 10, 1934. Furthermore, we have found also that the viscosities of the solutions of the two salts, lithium bromide and lithium chloride, in certain proportions, are considerably lower than the viscosities of the solutions of either salt alone. The low viscosity feature of the solutions of the mixed salts is highly advantageous in respect to the cost of circulating and bringing the solution into contact with the gas to be dehumidified and in increasing the rate of heat transfer between the solution and cooling surfaces, when the latter are employed to cool the solution during use.

The following observations are illustrative of the effect of lithium bromide and lithium chloride on the mutual solubilities of each in water and of the vapor pressure of solutions of the two salts compared with that of a solution of either salt alone at corresponding temperatures. For example, at 90° F., 61 grams of lithium bromide forms a saturated solution with 37.5 grams of water the vapor pressure of which solution is about 2 mm. of mercury; and 5 grams of lithium chloride form a saturated solution with 5.9 grams of water the vapor pressure of which solution is about 4.1 mm. of mercury. Contrasted with these solubilities and vapor pressures, we find that the aforesaid quantities of the two salts together dissolve in only 34 grams of water (compared to a total of 43.4 grams when separately dissolved) to form a solution which is saturated with respect to both salts. The vapor pressure of the saturated solution so obtained is about 1.6 mm. of mercury, that is the vapor pressure is 20 per cent lower than that of a saturated solution of lithium bromide and 61 per cent lower than that of a saturated solution of lithium chloride.

At 90° F. the relative proportions of the salts, expressed as the weights of the anhydrous compounds LiBr and LiCl, which can be dissolved in an aqueous solution to saturate it with respect to both salts is 93 per cent and 7 per cent respectively. When the proportion of lithium bromide is greater than 93 per cent and that of lithium chloride correspondingly less, solutions can be prepared which are saturated with respect to lithium bromide. Their vapor pressures are lower than those of a saturated solution of lithium bromide alone when the proportion of lithium chloride exceeds 1 per cent of the combined weight of both salts. When the proportion of lithium bromide is less than 93 per cent and that of lithium chloride is correspondingly greater, then solutions can be prepared which are saturated with respect to lithium chloride and unsaturated with respect to lithium bromide and their vapor pressures are also lower than that of saturated lithium bromide when the proportion of lithium chloride does not exceed about 19 per cent of the combined weight of both salts. Thus, mixed solutions of lithium bromide and lithium chloride containing the salts in the proportions by weight between $$\frac{1 \text{ LiCl}}{99 \text{ LiBr}} \text{ and } \frac{19 \text{ LiCl}}{81 \text{ LiBr}}$$

when saturated at 90° F., all have a lower vapor pressure than a saturated lithium bromide solution at the same temperature. This range covers solutions which are most advantageous for use in dehumidifying air and other gases. However, the invention is not limited thereto. When a lower temperature than 90° F. is chosen for comparing the saturation concentration of solutions of lithium bromide and lithium chloride, it is found that higher proportions of lithium chloride than those aforementioned may be employed to form mixed solutions having a lower vapor pressure than a lithium bromide solution at corresponding temperatures and degree of saturation. For example, at 40° F. the proportions of the two salts which when dissolved give solutions having a lower vapor pressure than a saturated lithium bromide solution at the same temperature is from

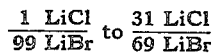
$$\frac{1 \text{ LiCl}}{99 \text{ LiBr}} \text{ to } \frac{31 \text{ LiCl}}{69 \text{ LiBr}}$$

The viscosities of the saturated solutions of the mixed salts are also generally lower than those of the single salts. For example, between the proportions of from

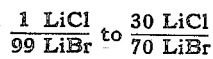
$$\frac{1 \text{ LiCl}}{99 \text{ LiBr}} \text{ to } \frac{30 \text{ LiCl}}{70 \text{ LiBr}}$$

the viscosities of the solutions saturated at 90° F. are lower than saturated lithium bromide solution.

Thus, we have found that at any given temperature ordinarily encountered in air dehumidification a range of proportions of lithium bromide to lithium chloride exists over which solutions can be prepared having a lower vapor pressure than a correspondingly concentrated aqueous solution of either salt alone at like temperature. The salts dissolve readily in water and may be used at concentrations considerably remote from saturation and still obtain relatively low vapor pressures without risk of crystal formation which would tend to clog the apparatus.

It will be understood that the foregoing proportions, given by way of illustration, are not to be regarded as limiting the invention, inasmuch as it will be seen that suitable proportions vary with the temperature. The most effective proportions, however, are those in which the solutions exhibit a lower vapor pressure than that of a correspondingly concentrated solution of either lithium bromide or lithium chloride alone at the same temperatures. In addition to possessing a lower vapor pressure than correspondingly concentrated solutions of either salt alone, solutions of the two salts have the advantage that, in contrast the solutions of the single salts, they have lower viscosities and consequently are easier to circulate and cool when passed over a cooling surface. The solutions also do not hydrolyze to any significant extent; they are odorless, and the solute is non-volatile under ordinary conditions of use. Therefore, they may be used for long periods of time in suitable dehumidifying apparatus without damage to, or contamination of, the air or other like gas in contact with the solution.

The hereindescribed mixed solutions of lithium bromide and lithium chloride are advantageous for use in methods of dehumidifying and conditioning air and other gases, in that (1) air or like gas can be dried to a much lower relative humidity than could be obtained heretofore by use of known salt solutions without cooling the same below atmospheric temperatures; (2) our new solution can be repeatedly or continuously reconcentrated without decomposition or significant loss of solute; and (3) the solutions possess a relatively low viscosity and permit more rapid heat transfer to a cooling surface and may be circulated readily with less consumption of power.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:—

1. A composition of matter comprising an aqueous solution containing lithium bromide and lithium chloride in the proportions of

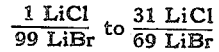
$$\frac{1 \text{ LiCl}}{99 \text{ LiBr}} \text{ to } \frac{31 \text{ LiCl}}{69 \text{ LiBr}}$$

2. A composition of matter comprising an aqueous solution containing lithium bromide and lithium chloride in the proportions of

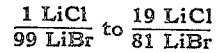
$$\frac{1 \text{ LiCl}}{99 \text{ LiBr}} \text{ to } \frac{19 \text{ LiCl}}{81 \text{ LiBr}}$$

SHELDON B. HEATH.
FOREST R. MINGER.